(12) United States Patent
Suzuki et al.

(10) Patent No.: US 7,652,850 B2
(45) Date of Patent: Jan. 26, 2010

(54) ROTATING DISK TYPE STORAGE UNIT WITH REDUCED VIBRATION

(75) Inventors: Kenji Suzuki, Ibaraki (JP); Toshihiko Shimizu, Ibaraki (JP); Shingo Tsuda, Kanagawa (JP); Kouki Uefune, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 318 days.

(21) Appl. No.: 11/132,049

(22) Filed: May 17, 2005

(65) Prior Publication Data

US 2005/0254177 A1 Nov. 17, 2005

(30) Foreign Application Priority Data

May 17, 2004 (JP) .............................. 2004-145976

(51) Int. Cl.
*G11B 21/08* (2006.01)
*G11B 5/55* (2006.01)

(52) U.S. Cl. ..................................... 360/264.9; 360/265
(58) Field of Classification Search ... 360/264.7–264.8, 360/264.9, 265
See application file for complete search history.

(56) References Cited

U.S. PATENT DOCUMENTS

| | | | | | |
|---|---|---|---|---|---|
| 4,908,816 | A | * | 3/1990 | Champagne et al. | ......... 720/666 |
| 5,122,702 | A | * | 6/1992 | Nakazato | ..................... 310/13 |
| 5,260,618 | A | * | 11/1993 | Dunfield et al. | ........ 310/154.21 |
| 5,459,362 | A | * | 10/1995 | Dunfield et al. | ........ 310/154.21 |
| 5,616,869 | A | * | 4/1997 | Valent | ................... 73/862.541 |
| 5,986,362 | A | * | 11/1999 | Sukagawa et al. | ............. 310/12 |
| 6,347,023 | B1 | * | 2/2002 | Suwa | ....................... 360/264.8 |
| 6,421,208 | B1 | * | 7/2002 | Oveyssi | .................. 360/264.8 |
| 6,462,914 | B1 | * | 10/2002 | Oveyssi et al. | ........... 360/264.8 |
| 6,577,474 | B2 | * | 6/2003 | Kazmierczak et al. | ... 360/264.9 |
| 6,606,223 | B2 | * | 8/2003 | Ooi et al. | .................. 360/264.9 |
| 6,633,457 | B1 | * | 10/2003 | Lin et al. | .................. 360/264.9 |
| 6,816,342 | B1 | * | 11/2004 | Oveyssi | ....................... 360/265 |
| 6,816,343 | B1 | * | 11/2004 | Oveyssi | ...................... 360/265 |
| 2002/0097527 | A1 | * | 7/2002 | Chang | ..................... 360/264.7 |
| 2003/0179503 | A1 | | 9/2003 | Choi | |

FOREIGN PATENT DOCUMENTS

JP 61-46901 B2 10/1986
JP 07-288966 10/1995

* cited by examiner

*Primary Examiner*—Craig A Renner
*Assistant Examiner*—Carlos E Garcia
(74) *Attorney, Agent, or Firm*—Townsend and Townsend and Crew LLP; John Henkhaus

(57) ABSTRACT

Embodiments of the invention decrease bending vibrations and torsional vibrations of a voice coil generated by off-plane vibrational forces on the voice coil to reduce noise and to enable a large capacity. In one embodiment, a rotating disk type storage unit comprises a rotating disk recording medium, a head that moves radially relative to the rotating disk recording medium to perform recording or reproduction, a turnable actuator having mounted on one side thereof the head, and a voice coil motor to drive the actuator. The voice coil motor comprises a voice coil mounted on the other side end of the actuator, and a magnet arranged in opposition to the voice coil. A magnet outer periphery of the magnet disposed distant from an actuator turning center is formed to be arcuately concave in shape, and the concave-shaped outer periphery intersects the voice coil.

13 Claims, 7 Drawing Sheets

ROTATING DISK TYPE STORAGE UNIT WITH REDUCED VIBRATION

CROSS-REFERENCES TO RELATED APPLICATIONS

This application claims priority from Japanese Patent Application No. JP2004-145976, filed May 17, 2004, the entire disclosure of which is incorporated herein by reference.

BACKGROUND OF THE INVENTION

The present invention relates to a rotating disk type storage unit, and is suited to a rotating disk type storage unit, in which a voice coil motor drives an actuator mounting thereon a head.

A magnetic disk apparatus exemplary of a rotating disk type storage unit drives an actuator mounting thereon a magnetic head to thereby position the magnetic head that performs recording or reproduction of information on a magnetic disk. Used as a drive source for the actuator is a voice coil motor comprising a voice coil mounted on one end of the actuator, a magnet arranged in opposition to the voice coil, and a voice yoke member that forms a magnetic circuit. A thrust moment of the actuator is obtained from electric current applied to the voice coil of the voice coil motor and a magnetic circuit formed by the magnet and the voice yoke member.

In conventional magnetic disk apparatuses, there is disclosed a construction in JP-B-61-46901 (Patent Document 1), in which a thrust moment generated in a voice coil is made uniform in a range of movement of the voice coil.

With such magnetic disk apparatus, a length in a direction perpendicular to a direction of movement of the voice coil is made long from a central portion thereof to an edge thereof by forming a magnet such that its length perpendicular to the direction of movement of the voice coil is made long from a central portion thereof to an edge thereof. In such construction, a thrust moment tending to become small at ends of the range of movement of the voice coil is made uniform in the range of movement of the voice coil.

BRIEF SUMMARY OF THE INVENTION

At the same time a thrust moment for driving of an actuator is generated in a voice coil motor, a force in parallel with an axis of turning of the actuator is concomitantly generated in the voice coil motor. Such force, that is, a force formed by electric current applied to the voice coil to be perpendicular to a plane (called a coil surface) generates torque about a center of turning of the actuator to cause bending vibrations and torsional vibrations of the voice coil. Such vibrations make a source that makes noise. Further, since such vibrations cause difficulties in positioning of a head, it becomes difficult to heighten a positional accuracy and it is not possible to realize a magnetic disk apparatus having a large capacity.

Also, since a line of magnetic force from the vicinity of a magnetic pole changing region of a magnet, or the vicinity of an outer end of the magnet is not made perpendicular to the coil surface, magnetic flux contributing to a thrust force is decreased. Therefore, the thrust moment is decreased in the vicinity of the magnetic pole changing region of the magnet, or the vicinity of the outer end of the magnet, so that the head disposed at a tip end of the actuator cannot be moved at high speed, and thus high-speed access is made difficult in the magnetic disk apparatus.

With the magnetic disk apparatus disclosed in Patent Document 1, in order to improve a situation, in which magnetic flux contributing to generation of a thrust moment is decreased at ends of the range of movement of the voice coil to result in reduction in the thrust moment, a length of the magnet in a direction perpendicular to a direction of movement of the voice coil is made long to compensate for a decrease in thrust moment at the ends of the range of movement of the voice coil, thus achieving uniformity of the thrust moment in the range of movement of the voice coil.

However, the fact that magnetic flux contributing to generation of a thrust moment is small in density at the ends of the range of movement of the voice coil means that magnetic flux not perpendicular to the coil surface is increased. By applying an electric current to the voice coil of the voice coil motor, magnetic flux not perpendicular to the coil surface generates a force normal to the coil surface. Such force makes a force to vibrate the voice coil of the voice coil motor to cause a factor for generation of noise and obstruction in an increase in recording capacity of a magnetic disk apparatus. That is, Patent Document 1, in which it is intended for compensation for a decrease in thrust moment at the ends of the range of movement of the voice coil, involves a problem that by lengthening the magnet from a central portion to ends in the range of movement of the voice coil, a force to vibrate the voice coil of the voice coil motor is also increased at the ends of the range of movement of the voice coil.

A problem in the prior art will be further specifically described with reference to FIGS. 8 to 10. FIG. 8 is a plan view schematically showing an essential part of a voice coil motor used in a conventional magnetic disk apparatus, FIG. 9 is a cross sectional view taken along the line A-A in FIG. 8, and FIG. 10 is a view illustrating a change in thrust moment when the voice coil of the voice coil motor is moved, with reference to a cross sectional view taken along the line B-B in FIG. 8.

A voice coil motor 11 serves as a drive source for an actuator 5 that holds a magnetic head at a tip end thereof. The voice coil motor 11 comprises a voice coil 7 provided in an opposite position of an actuator turning center 6 to the magnetic head 3, a magnet 9 mounted in parallel with a surface of the voice coil 7, and a voice yoke member 10 that cooperates with the magnet 9 to form a magnetic circuit.

Electric current is applied, as indicated by an arrow 19 (see FIG. 8), to the voice coil 7 present in the magnetic circuit formed by the magnet 9 whereby the voice coil motor 11 generates thrust moments required for movement of the magnetic head 3 to a target radial position. With the magnetic disk apparatus, thrust moments are generated in regions 16a, 16b, in which the voice coil 7 and the magnet 9 overlap each other, and the regions are present in two locations on both right and left sides (see FIG. 8). The magnet 9 is made opposite in polarity (see FIGS. 10(*a*) and 10(*b*)) so that senses 20 of magnetic flux acting on the voice coil 7 in two regions, in which thrust moments are generated, become opposite to each other. Here, since electric currents flowing through a cross sectional portion of the voice coil 7 shown in FIGS. 10(*a*) and 10(*b*) are also opposite in sense to each other, thrust moments in the same direction are generated in the two overlapping regions 16a, 16b of the magnet 9 and the voice coil 7. Accordingly, the sum of thrust moments in the two overlapping regions 16a, 16b makes a thrust moment of the entire voice coil 7.

In order to increase the magnetic disk apparatus in storage capacity, it is necessary to make a data area on the magnetic disk 2 wide in range so that both sides of the voice coil 7 are moved with one side of the voice coil 7 in the vicinity (a position C1 shown in FIGS. 8 and 10) of a magnetic pole changing region 8 of the magnet 9, or in the vicinity (a position C2 shown in FIGS. 8 and 10) of an outer end of the magnet 9. Since magnetic flux contributing to thrust moments is decreased in magnitude in such vicinities as shown in FIG. 10(c), thrust moments become small in both of the two overlapping regions 16a, 16b. On the other hand, magnetic flux contributing to thrust moments is increased in magnitude in an intermediate region between the vicinities, so that thrust moments become large in both the two overlapping regions 16a, 16b. Therefore, thrust moments are not uniformized in a range, in which the voice coil is moved, whereby the magnetic head cannot be moved at high speed in the vicinity of the outer end of the magnetic pole changing region 8 or the magnet 9 and a cause for generation of vibrations is produced.

Also, since a decrease in magnetic flux, which contributes to thrust moments in the vicinity of the magnetic pole changing region 8 of the magnet 9, means an increase in forces perpendicular to a coil surface, which are caused by magnetic flux in parallel with the coil surface, an increase in off-plane vibrational forces makes a factor for noise and obstruction in positioning.

It is a feature of the invention to realize a rotating disk type storage unit, in which bending vibrations and torsional vibrations of a voice coil generated by off-plane vibrational forces on the voice coil are reduced and which enables a large capacity.

It is a further feature of the invention to realize a rotating disk type storage unit, in which thrust moments of a voice coil motor is made uniform in a range of movement of a voice coil and which enables high-speed access for movement of a head at high speed and accurate positioning of the head.

In addition, other features and advantages of the invention will become apparent from the following descriptions.

The invention has a feature in that an outer periphery of a magnet distant from a turning axis of an actuator is concave in shape and the concave-shaped outer periphery of the magnet intersects a voice coil.

A first embodiment of the invention provides a rotating disk type storage unit comprising a rotating disk recording medium, a head that moves radially relative to the rotating disk recording medium to perform recording or reproduction, a turnable actuator having mounted on one side thereof the head, and a voice coil motor that drives the actuator, and wherein the voice coil motor comprises a voice coil mounted on the other side of the actuator, and a magnet arranged in opposition to the voice coil, and a magnet outer periphery of the magnet disposed distant from an actuator turning center is formed to be concave in shape, and the concave-shaped outer periphery of the magnet intersects the voice coil.

A second embodiment of the invention provides a rotating disk type storage unit comprising a rotating disk recording medium, a head that moves radially relative to the rotating disk recording medium to perform recording or reproduction, a turnable actuator having mounted on one side thereof the head, and a voice coil motor that drives the actuator, and wherein the voice coil motor comprises a voice coil mounted on the other side of the actuator, and a magnet arranged in opposition to the voice coil, the voice coil is formed to have a substantially circular shape including a circular shape and an elliptical shape, and a magnet outer periphery of the magnet disposed distant from an actuator turning center is formed to be concave in shape, and the concave-shaped outer periphery of the magnet intersects the voice coil.

A third embodiment of the invention provides a rotating disk type storage unit comprising a rotating disk recording medium, a head that moves radially relative to the rotating disk recording medium to perform recording or reproduction, a turnable actuator having mounted on one side thereof the head and having an axis of turning, and a voice coil motor that drives the actuator, and wherein the voice coil motor comprises a voice coil mounted on the other side of the actuator, and a magnet arranged in opposition to the voice coil, and the magnet comprises a pair of magnetic pole portions, which are opposed to both side portions of the voice coil and have different polarities, and is formed so that as the voice coil moves, a thrust moment generating region on one of the magnetic pole portions is increased while a thrust moment generating region on the other of the magnetic pole portions is decreased.

A fourth embodiment of the invention provides a rotating disk type storage unit comprising a rotating disk recording medium, a head that moves radially relative to the rotating disk recording medium to perform recording or reproduction, a turnable actuator having mounted on one side thereof the head and having an axis of turning, and a voice coil motor that drives the actuator, and wherein the voice coil motor comprises a voice coil mounted on the other side of the actuator, a magnet arranged in opposition to the voice coil, and a voice yoke member cooperating with the magnet to form a magnetic circuit, and the magnet is formed so that in a moving range of the voice coil, an outer periphery of the magnet is made substantially normal to a direction of electric current applied to the voice coil.

According to the invention, it is possible to realize a rotating disk type storage unit, in which bending vibrations and torsional vibrations of a voice coil generated by off-plane vibrational forces on the voice coil are reduced and which enables a large capacity.

Also, according to the invention, it is possible to realize a rotating disk type storage unit, in which thrust moments of a voice coil motor is made uniform in a range of movement of a voice coil and which enables high-speed access for turning movement of a head at high speed and accurate positioning of the head.

DETAILED DESCRIPTION OF THE INVENTION

Figure 1:
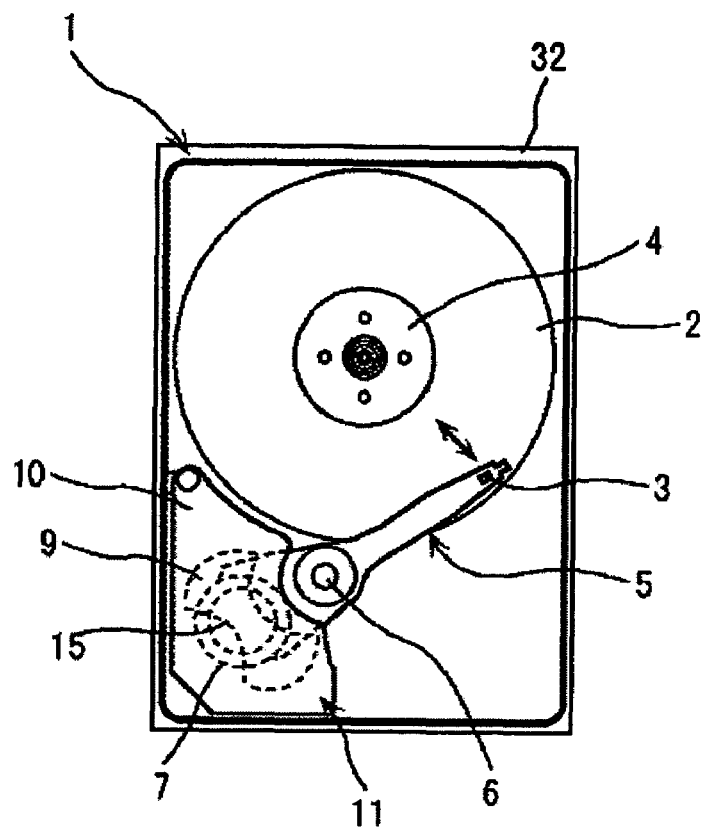
FIG. 1 is a schematic view showing a magnetic disk apparatus according to a first embodiment of the invention.

Plural embodiments of the invention will be described below with reference to the drawings. The same reference numerals in the drawings showing the respective embodiments and in the drawings showing the prior art denote the same or equivalent parts.

First, a magnetic disk apparatus according to a first embodiment of the invention will be described with reference to FIGS. 1 to 7. In the first embodiment, an explanation will be given to a magnetic disk apparatus 1 exemplary of a rotating disk type storage unit.

An entire construction of a magnetic disk apparatus 1 according to the embodiment will be described with reference to FIG. 1. FIG. 1 is a schematic view showing the magnetic disk apparatus according to the first embodiment.

The magnetic disk apparatus 1 comprises a magnetic disk 2 that constitutes a rotating disk recording medium, a magnetic head 3 that moves radially relative to the magnetic disk 2 to perform recording or reproduction, a turnable actuator 5 mounting on one side thereof the magnetic head 3 and having a rotating shaft 61, and a voice coil motor 11 to drive the actuator 5. The magnetic disk apparatus 1 is provided with a base 32 and a cover (not shown) of a disk enclosure, the base 32 being formed by die casting of aluminum, or press working of steel sheet such as stainless steel or the like.

The magnetic disk 2 is mounted at a center thereof to a spindle motor 4, which serves as a drive source, and arranged substantially in parallel with a bottom surface of the base 32. A control device (not shown) performs drive control, such as start of driving, suspension of driving, etc., of the spindle motor 4. Information is recorded on the magnetic disk 2 in high density, and the magnetic disk is rotated at high speed as the spindle motor 4 rotates.

The actuator 5 is shaped to be thin and elongated, the actuator having an actuator turning center 6 at a center thereof and being rotatable. The turning center of the actuator 5 is positioned outside an outer periphery of the magnetic disk 2. One side end of the actuator 5 is moved above the magnetic disk 2 from outside the outer periphery of the magnetic disk 2 to reciprocate radially above the magnetic disk 2. Also, the other side end of the actuator 5 is always caused to reciprocate outside the magnetic disk 2.

The magnetic head 3 is mounted at the one side end of the actuator 5. The magnetic head 3 reciprocates radially above the magnetic disk 2 as the one side end of the actuator 5 reciprocates. An air flow generated upon rotation of the magnetic disk 2 causes the magnetic head 3 to fly above the magnetic head 3 with a slight gap therebetween, in which state the magnetic head is radially moved. In addition, when the magnetic disk apparatus 1 is stopped in operation, the one side end of the actuator 5 withdraws outside the magnetic disk 2, and the magnetic head 3 correspondingly withdraws outside the magnetic disk 2.

A voice coil 7 constituting a part of the voice coil motor 11 is mounted on the other side end of the actuator 5. The voice coil motor 11 serves as a drive source for the actuator 5 to comprise the voice coil 7, a magnet 9, and a voice yoke member 10.

When the magnetic disk apparatus 1 is started, the spindle motor 4 drives to rotate the magnetic disk 2 at high speed, and the voice coil motor 11 drives to move the actuator 5. Thereby, the magnetic head 3 disposed at the tip end of the actuator 5 is caused to fly minutely relative to the magnetic disk 2, and as a drive moment generated by the voice coil motor 11 moves the actuator 5, the magnetic head 3 is radially moved to a target on the magnetic disk 2 to perform writing and reading of information from the magnetic disk 2.

Figure 2:
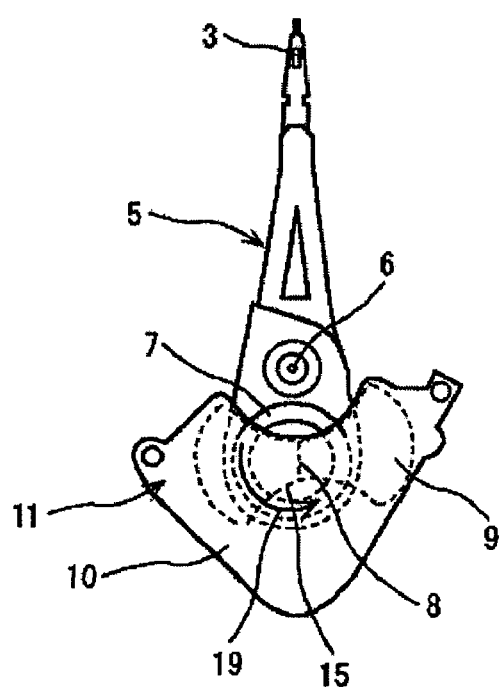
FIG. 2 is a plan view showing an actuator provided with a voice coil motor of the magnetic disk apparatus shown in FIG. 1.
Figure 3:
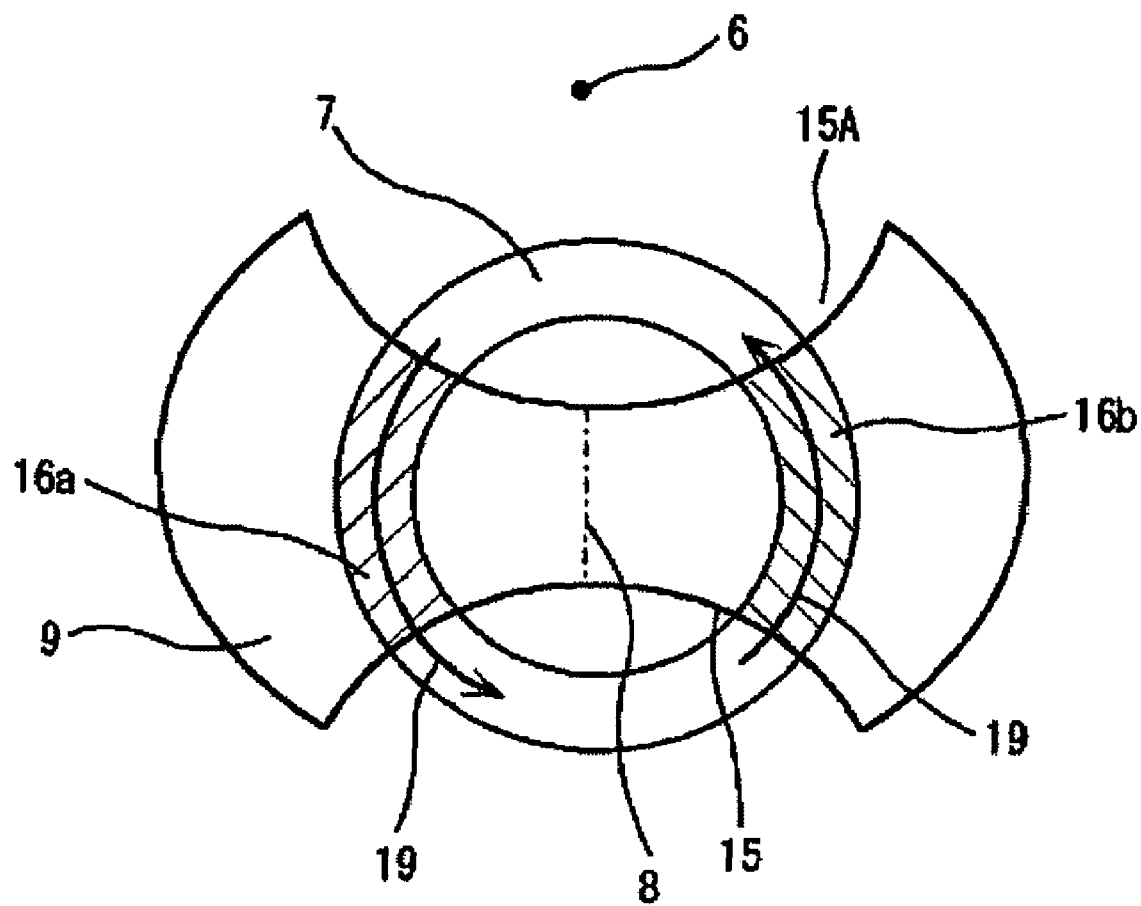
FIG. 3 is an enlarged plan view showing a voice coil and a magnet in the voice coil motor shown in FIG. 2.
Figure 4:
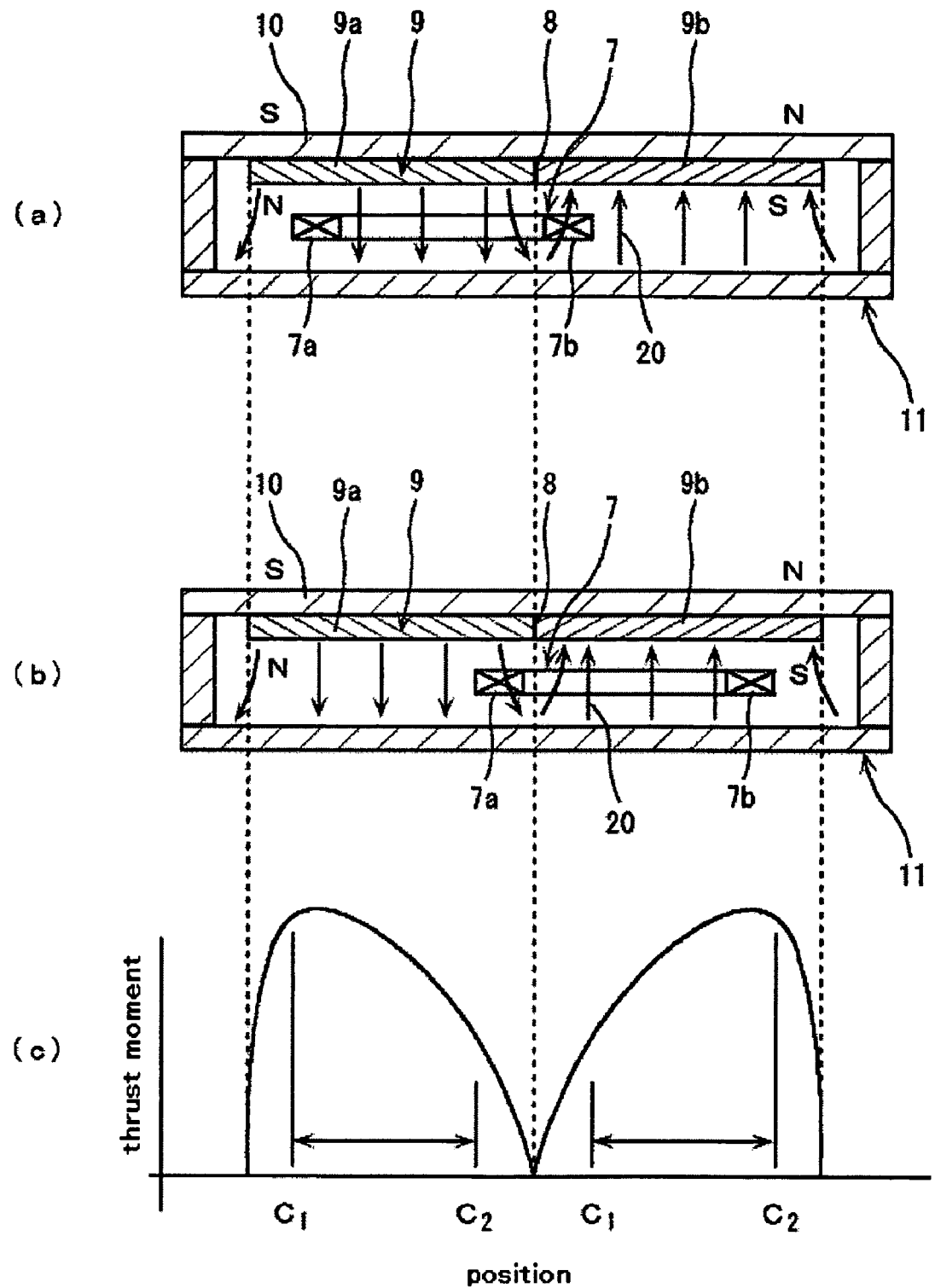
FIG. 4 is a view illustrating a change in thrust moment when the voice coil of the voice coil motor shown in FIG. 2 is moved.

Subsequently, an explanation will be given to the construction, operation and function of the voice coil motor 11 with reference to FIGS. 2 to 5. FIG. 2 is a plan view showing an essential part of the actuator provided with the voice coil motor of the magnetic disk apparatus shown in FIG. 1, FIG. 3 is an enlarged plan view showing the voice coil and the magnet in the voice coil motor shown in FIG. 2, and FIG. 4 is a view illustrating a change in thrust moment when the voice coil of the voice coil motor shown in FIG. 2 is moved.

The voice coil motor 11 comprises the voice coil 7, the magnet 9, and the voice yoke member 10 as described above. In addition, for the voice coil motor 11, a direction along a longitudinal direction of the actuator 5 is indicated as a depthwise direction, and a direction intersecting the longitudinal direction is indicated as a right and left direction.

The voice coil 7 is mounted such that its coil surface is made in parallel with a surface of the magnetic disk 2, the voice coil being positioned on an opposite side of the magnetic head 3 to the actuator turning center 6 to be mounted on the actuator 5. The voice coil 7 is formed to be substantially circular in shape. The substantially circular shape includes a somewhat deformed circular shape and an elliptical shape, not to mention a perfect circular shape. In the embodiment, the voice coil 7 having a circular shape and affording easy manufacture is used.

The magnet 9 is arranged in opposition to the voice coil 7 with a gap therebetween and mounted to an inner surface of the voice yoke member 10. The magnet 9 comprises a pair of magnetic pole portions 9a, 9b. The pair of magnetic pole portions 9a, 9b are opposed to both side portions of the voice coil 7 and have different polarities. In addition, for the purpose of facilitating manufacture of the magnet 9, the respective magnetic pole portions 9a, 9b are formed by the use of two magnetic pole members having one polarity on one surface but they may be formed by a single magnetic pole member having the same function as that of the magnetic pole members at need.

A magnet outer periphery 15 of the magnet 9 disposed distant from the actuator turning center 6 is formed to be arcuately concave in shape and to intersect the voice coil 7. Also, a magnet inner periphery 15A disposed near to the actuator turning center 6 is also formed to be arcuately concave in shape and to intersect the voice coil 7. In a moving range of the voice coil 7, the magnet outer periphery 15 and the magnet inner periphery 15A, which intersect the voice coil 7, are formed to be substantially normal to a direction 19 of electric current applied to the voice coil 7. In addition, deepest portions of the concave shapes of the magnet outer periphery 15 and the magnet inner periphery 15A of the magnet 9 are positioned in agreement with a magnetic pole changing region 8.

With such construction, one 9a of the magnetic pole portions and one side 7a of the voice coil 7 include an overlapping region 16a, and the other 9b of the magnetic pole portions and the other side 7b of the voice coil 7 include an overlapping region 16b (see FIG. 3). In the moving range of the voice coil 7, both sides of the voice coil 7 are constructed not to form an overlapping region with a single magnetic pole portion 9a or 9b at a time. The overlapping regions 16a, 16b constitute thrust moment generating regions. The magnet 9 is formed such that the magnetic pole changing region 8 constituted by the pair of magnetic pole portions 9a, 9b is smaller in depthwise dimension than that magnet portion, which overlaps the voice coil 7 on the both sides.

The magnet 9 is formed such that the thrust moment generating region on one 9a or 9b of the magnetic pole portions increases while the thrust moment generating region on the other 9b or 9a of the magnetic pole portions decreases. Such increase and such decrease can be made to become substantially equal to each other.

The magnet 9 is formed such that as the voice coil moves, the overlapping region 16a, or 16b, in which one 9a or 9b of the magnetic pole portions and the voice coil 7 overlap, increases while the overlapping region 16b, or 16a, in which one 9b or 9a of the magnetic pole portions and the voice coil 7 overlap, decreases. Here, the increase and decrease are made to be substantially equal to each other.

The voice yoke member 10 cooperates with the magnet 9 to form a magnetic circuit, and is mounted to have upper and bottom surfaces in parallel with the surface of the voice coil 7. The voice yoke member 10 is formed to have a rectangular shaped cross section.

Electric current is applied, as indicated by arrows 19 (see FIGS. 2 and 3), to the voice coil 7 present in the magnetic circuit formed by the magnet 9 whereby the voice coil motor 11 generates thrust moments required for movement of the magnetic head 3 to a target radial position. With the magnetic disk apparatus 1, thrust moments are generated in the regions 16a, 16b, in which the voice coil 7 and the magnet 9 overlap each other, and the regions are present in two locations on both right and left sides (see FIG. 3). The pair of magnetic pole portions 9a, 9b of the magnet 9 are made opposite in polarity (see FIGS. 4(a) and 4(b)) so that senses 20 of magnetic flux acting on the voice coil 7 in two regions, in which thrust moments are generated, become opposite to each other. Here, since electric currents flowing through the cross sectional portion of the voice coil shown in FIGS. 4(a) and 4(b) are also opposite to each other, thrust moments in the same direction are generated in the two overlapping regions 16a, 16b of the magnet 9 and the voice coil 7.

In order to increase the magnetic disk apparatus in storage capacity, it is necessary to make a data area on the magnetic disk 2 wide in range so that the voice coil 7 is moved with one side 7a of the voice coil 7 near to an outer end of the magnet 9 and the other side 7b near to (a position shown in FIG. 4(a)) the magnetic pole changing region 8 of the magnet 9, or with one side 7a of the magnet 9 near to the magnetic pole changing region 8 of the magnet 9 and the other side 7b near to (a position shown in FIG. 4(b)) the outer end of the magnet 9.

According to the embodiment, in a position shown in FIG. 4(a), the thrust moment of the other side 7b of the voice coil 7 becomes somewhat small but the thrust moment of the one side 7a of the voice coil 7 becomes larger than the former thrust moment. Thereby, the thrust moment of the entire voice coil 7 corresponding to the sum of the both thrust moments can be sharply increased relative to a conventional one. In a position shown in FIG. 4(b), the thrust moment of the one side 7a of the voice coil 7 becomes somewhat small but the thrust moment of the other side 7b of the voice coil 7 becomes larger than the former thrust moment. Thereby, the thrust moment of the entire voice coil 7 corresponding to the sum of the both thrust moments can be sharply increased relative to a conventional one. Accordingly, the thrust moment of the entire voice coil 7 in the position shown in FIG. 4(a) and in the position shown in FIG. 4(b) can be sharply increased relative to a conventional one and is uniformized. Also, in an intermediate position in the movement from the position shown in FIG. 4(a) to the position shown in FIG. 4(b), the thrust moment of the entire voice coil 7 can be sharply increased relative to a conventional one and is uniformized. Accordingly, the thrust moment of the entire voice coil 7 is increased and uniformized in the entire range of movement of the voice coil 7. Thereby, it is possible to move the magnetic head even in the vicinity of the magnetic pole changing region 8 of the magnet 9 or the magnet 9 at high speed, thus enabling realizing the magnetic disk apparatus 1 capable of high-speed access, in which the magnetic head 3 is moved and positioned at high speed.

Also, according to the embodiment, by making the outer peripheral shape of the magnet 9 of the voice coil motor 11 of the magnetic disk apparatus 1 concave, making the magnetic pole changing region 8 of the magnet 9 small in length, and directing an electric current, which flows through the voice coil 7 at positions of intersection of the voice coil 7 and the magnet outer periphery 15, in a direction substantially normal to the magnet concave-shaped outer periphery 15 intersecting the voice coil, it is possible to decrease noise caused by bending vibrations and torsional vibrations of the voice coil 7, which are generated by off-plane vibrational forces applied on the voice coil 7, to realize the magnetic disk apparatus 1 of large capacity owing to reduction in vibrations, which obstruct positioning.

Also, according to the embodiment, since the magnetic pole changing region 8 defined by the pair of magnetic pole portions 9a, 9b is formed to be smaller in depthwise dimension than that magnet portion, which overlaps the voice coil 7 on the both sides thereof, it is possible to suppress an increase in off-plane vibrational forces, which are produced by magnetic flux in parallel with the coil surface in the vicinity of the magnetic pole changing region 8 of the magnet 9. Thereby, it is possible to decrease noise and to enhance a positional accuracy. Further, since the magnetic pole changing region 8 has a small length, the voice yoke member 10 becomes hard to be saturated. Owing to this, it is possible to make the magnet 9 large in thickness, and by increasing that thrust moment, which drives the voice coil motor 11, it is possible to fabricate the magnetic disk apparatus 1, which realizes high-speed access.

Figure 5:
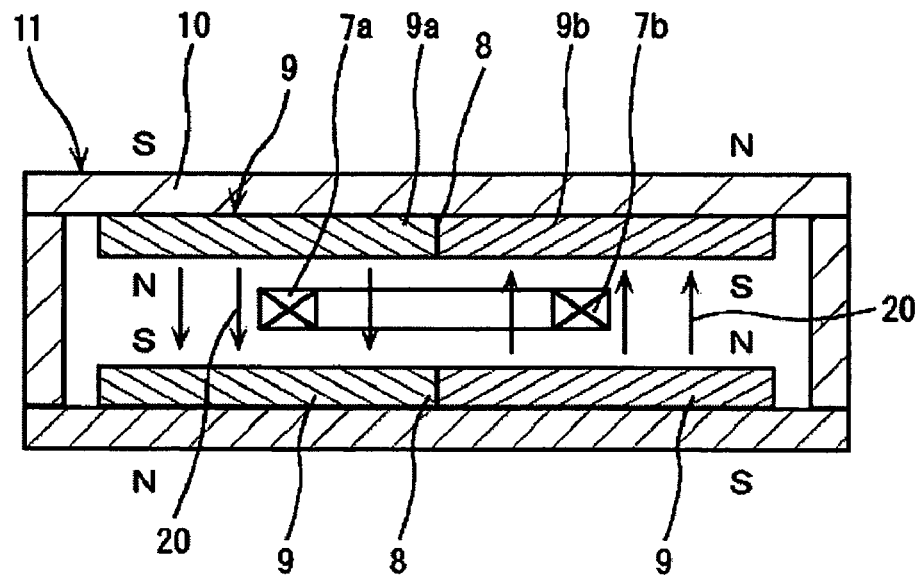
FIG. 5 is a cross sectional view showing a voice coil motor of a magnetic disk apparatus according to a second embodiment of the invention.

Subsequently, a second embodiment of the invention will be described with reference to FIG. 5. FIG. 5 is a cross sectional view showing a voice coil motor of a magnetic disk apparatus according to the second embodiment of the invention. The second embodiment is different from the first embodiment as described below, and fundamentally the same as the first embodiment in other respects.

According to the second embodiment, magnets 9 having a pair of magnetic pole portions of different polarities are arranged symmetrically to be in parallel with a voice coil 7 and in opposition to each other vertically. Thereby, it is possible to further decrease forces, which cause vibrations in an off-plane direction.

In addition, the invention is not limited to the embodiments disclosed above but allows modifications based on a prior art.

Figure 6:
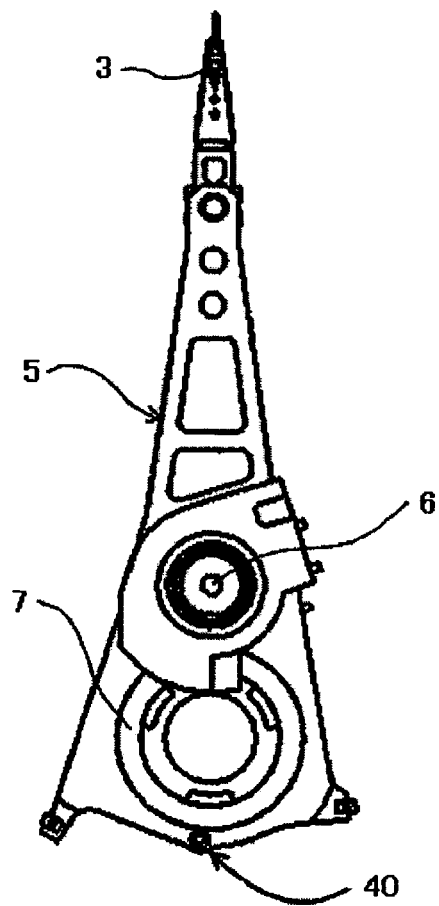
FIG. 6 is a plan view showing an actuator provided with a voice coil motor of a magnetic disk apparatus according to a third embodiment of the invention.
Figure 7:
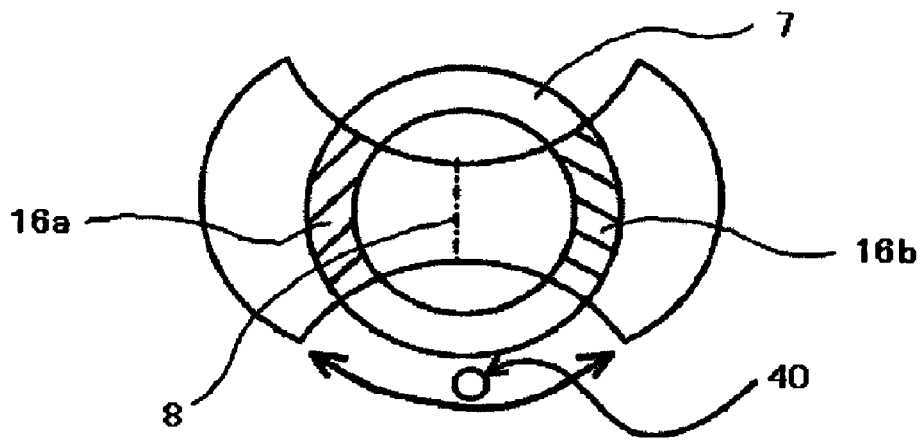
FIG. 7 is an enlarged plan view showing a voice coil and a magnet of the voice coil motor shown in FIG. 6.
Figure 8:
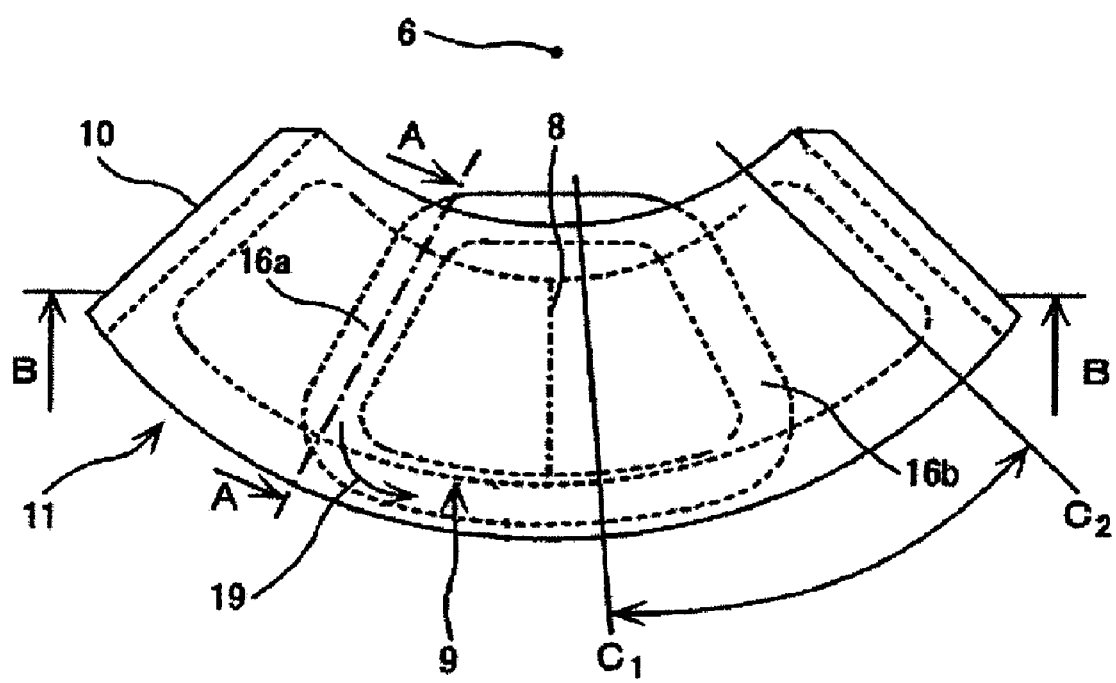
FIG. 8 is a plan view schematically showing an essential part of a voice coil motor used in a conventional magnetic disk apparatus.
Figure 9:
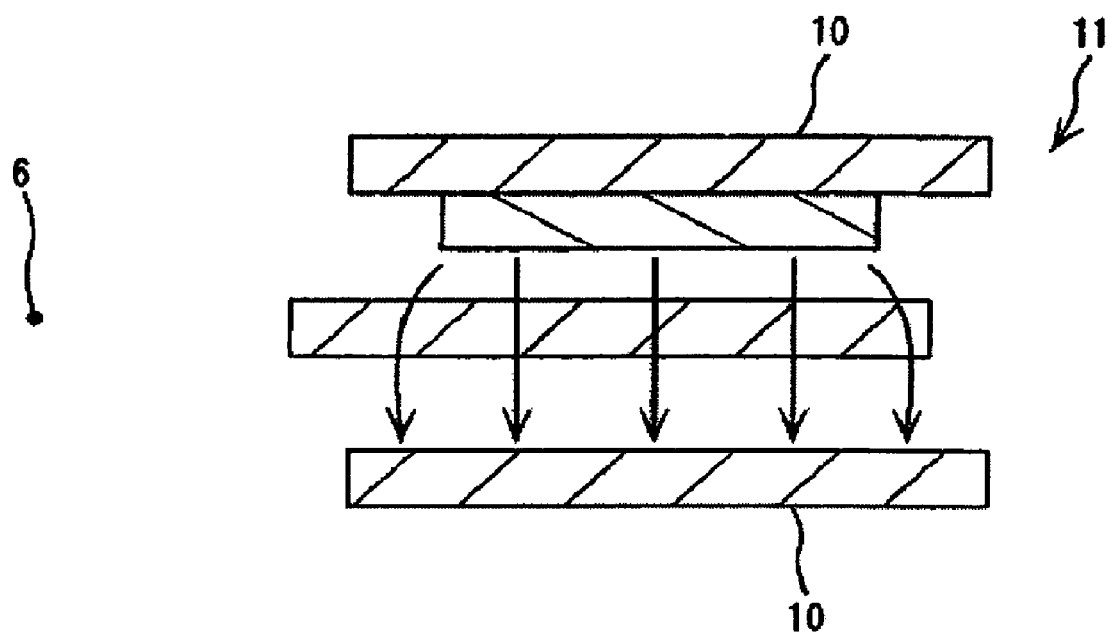
FIG. 9 is a cross sectional view taken along the line A-A in FIG. 8.
Figure 10:
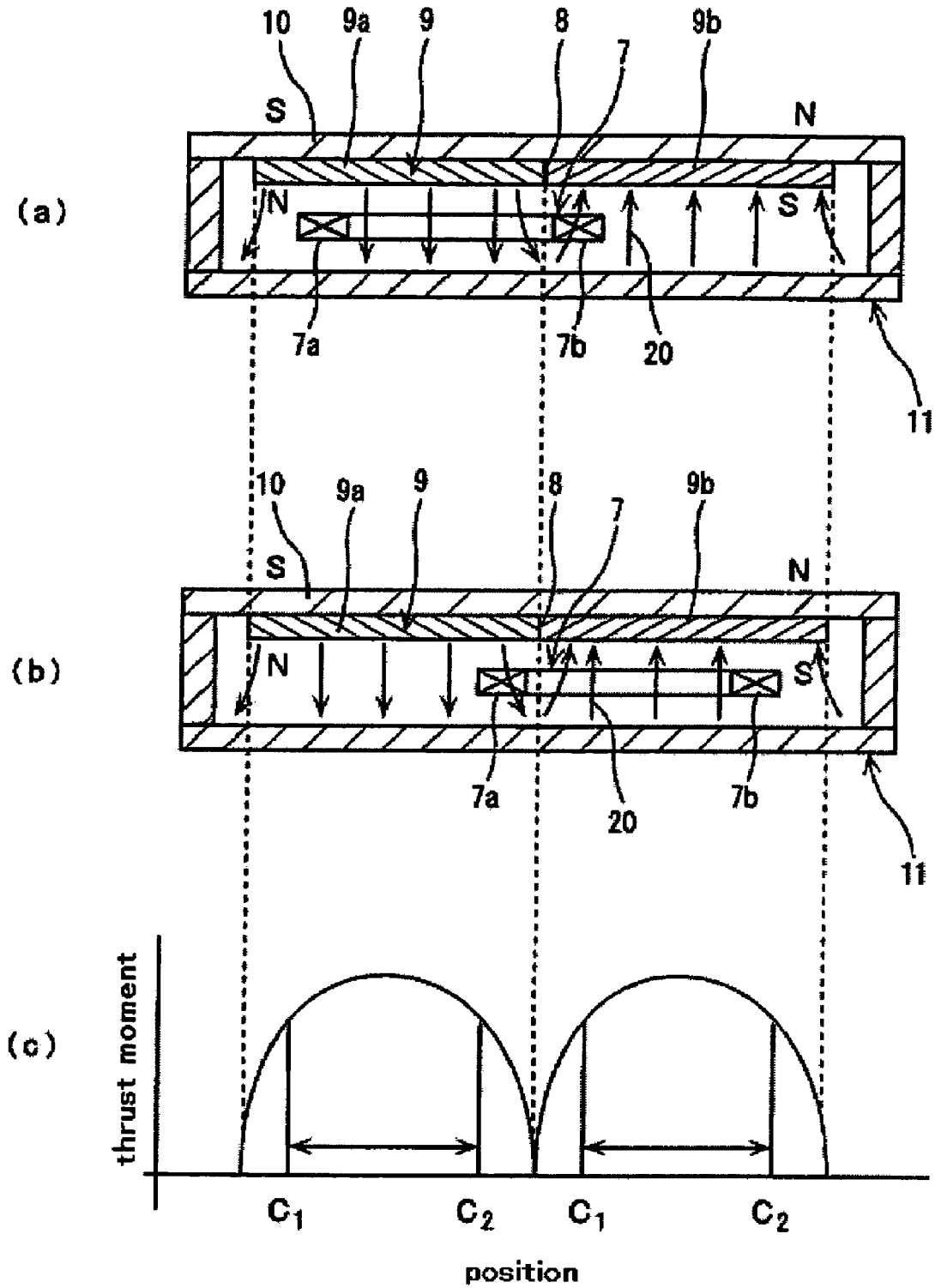
FIG. 10 is a view illustrating a change in thrust moment when the voice coil of the voice coil motor is moved, with reference to a cross sectional view taken along the line B-B in FIG. 8.

Subsequently, a third embodiment of the invention will be described with reference to FIGS. 6 and 7. FIG. 6 is a plan view showing an actuator provided with a voice coil motor of a magnetic disk apparatus according to the third embodiment of the invention, and FIG. 7 is an enlarged plan view showing the voice coil and a magnet in the voice coil motor shown in FIG. 6. The third embodiment is different from the first embodiment as described below, and fundamentally the same as the first embodiment in other respects.

A magnetic disk 2 has a smooth surface, and a magnetic head 3 flies above a surface of the magnetic disk 2 with a flying amount as small as ten and several nanometers whereby an increase in recording density is realized in the magnetic disk apparatus 1. Therefore, in the case where the magnetic head 3 is present on the smooth surface of the magnetic disk 2 when the magnetic disk apparatus 1 does not operate, strong adherence is caused between the magnetic head 3 and the magnetic disk 2 to cause a fear of obstruction in starting of the magnetic disk apparatus 1. In order to avoid obstruction in starting, a latch mechanism making use of an inertial latch and a solenoid provides for the function of maintaining a state of withdrawal so as to prevent the magnetic head 3 from adhering to the surface of the magnetic disk 2. In addition, there is a retract mechanism that makes use of leakage flux from a magnet 9 of a voice coil motor 11 and applies the law, in which a magnetic body generates an attractive force due to leakage flux, to maintain a state of withdrawal of the magnetic head 3 from the surface of the magnetic disk 2.

The third embodiment adopts a retract mechanism that makes use of leakage flux from the magnet of the voice coil motor 11. While such retract mechanism is adopted in actuators 5 of conventional magnetic disk apparatuses 1, restrictions on a shape of a magnet 9 cause a magnetic body, which generates an attractive force, to be mounted on a coil holder that supports a coil 7 of a voice coil motor 11 of an actuator 5. The shape of the magnet in the invention makes it possible to mount a retract pin 40, which generates an attractive force, on a plane defined by a turning center 6 of the actuator 11 and the magnetic head 3, so that it is possible to make the actuator 11 left-right symmetric in construction. Thereby, the third embodiment has an advantage that owing to mounting of the retract pin 40, deterioration in dynamics of the actuator 11 is not brought about.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A rotating disk type storage unit comprising:
    a rotating disk recording medium;
    a head that moves radially relative to the rotating disk recording medium to perform recording or reproduction;
    a turnable actuator having mounted on one side thereof the head, and
    a voice coil motor that drives the actuator;
    wherein the voice coil motor comprises a voice coil mounted on the other side of the actuator, and a magnet arranged in opposition to the voice coil,
    wherein a magnet outer periphery of the magnet disposed distant from an actuator turning center, and a magnet inner periphery of the magnet disposed proximate to the actuator turning center are both formed to be uninterruptedly concave in shape symmetrical to one another, and each concave-shaped magnet periphery of the magnet intersects at least two sections of the voice coil.

2. The rotating disk type storage unit according to claim 1, wherein the magnet comprises a pair of magnetic pole portions, which are opposed to both side portions of the voice coil and have different polarities.

3. The rotating disk type storage unit according to claim 2, wherein the magnet is formed so that a magnetic pole changing region defined by the pair of magnetic pole portions is smaller in depthwise dimension than a magnet portion of the magnet, which overlaps the voice coil on both sides thereof.

4. The rotating disk type storage unit according to claim 2, wherein the outer periphery of the magnet is arcuately concave in shape and a deepest portion of the concave shape is positioned on a magnetic pole changing region defined by the pair of magnetic pole portions.

5. The rotating disk type storage unit according to claim 4, wherein the magnet is set so that an increase in a thrust moment generating region on one of the magnetic pole portions and a decrease in a thrust moment generating region on the other of the magnetic pole portions become substantially equal to each other.

6. The rotating disk type storage unit according to claim 2, wherein the magnet is formed so that as the voice coil moves, a thrust moment generating region on one of the magnetic pole portions is increased while a thrust moment generating region on the other of the magnetic pole portions is decreased.

7. The rotating disk type storage unit according to claim 2, wherein the magnet is formed so that as the voice coil moves, an overlapping region of one of the magnetic pole portions and the voice coil increases while an overlapping region of the other of the magnetic pole portions and the voice coil decreases.

8. The rotating disk type storage unit according to claim 2, further comprising an another magnet comprising another pair of magnetic pole portions, wherein the two pairs of magnetic pole portions are arranged symmetrically above and below the voice coil.

9. The rotating disk type storage unit according to claim 1, wherein the magnet is formed so that the outer periphery thereof is arcuately concave in shape.

10. The rotating disk type storage unit according to claim 1, wherein the magnet is formed so that in the moveable range of the voice coil, the outer periphery of the magnet intersecting the voice coil is made substantially normal to a direction of electric current applied to the voice coil.

11. The rotating disk type storage unit according to claim 10, wherein the magnet is formed so that the outer periphery thereof is arcuately concave in shape.

12. A rotating disk type storage unit comprising:
    a rotating disk recording medium;
    a head that moves radially relative to the rotating disk recording medium to perform recording or reproduction;
    a turnable actuator having mounted on one side thereof the head; and
    a voice coil motor that drives the actuator;
    wherein the voice coil motor comprises a voice coil mounted on the other side of the actuator, and a magnet arranged in opposition to the voice coil,
    wherein the entire voice coil is formed to have a substantially circular shape or a substantially elliptical shape, and
    wherein a magnet outer periphery of the magnet disposed distant from an actuator turning center, and a magnet inner periphery of the magnet disposed proximate to the actuator turning center are both formed to be uninterruptedly concave in shape symmetrical to one another, and the concave-shaped periphery of the magnet intersects the voice coil.

13. The rotating disk type storage unit according to claim 12, wherein the magnet is formed so that the outer periphery thereof is arcuately concave in shape and an outer periphery of the magnet intersecting the voice coil is made substantially normal to a direction of electric current applied to the voice coil.

* * * * *